May 15, 1934.    L. H. MILES    1,958,633
SIREN
Original Filed Nov. 14, 1927
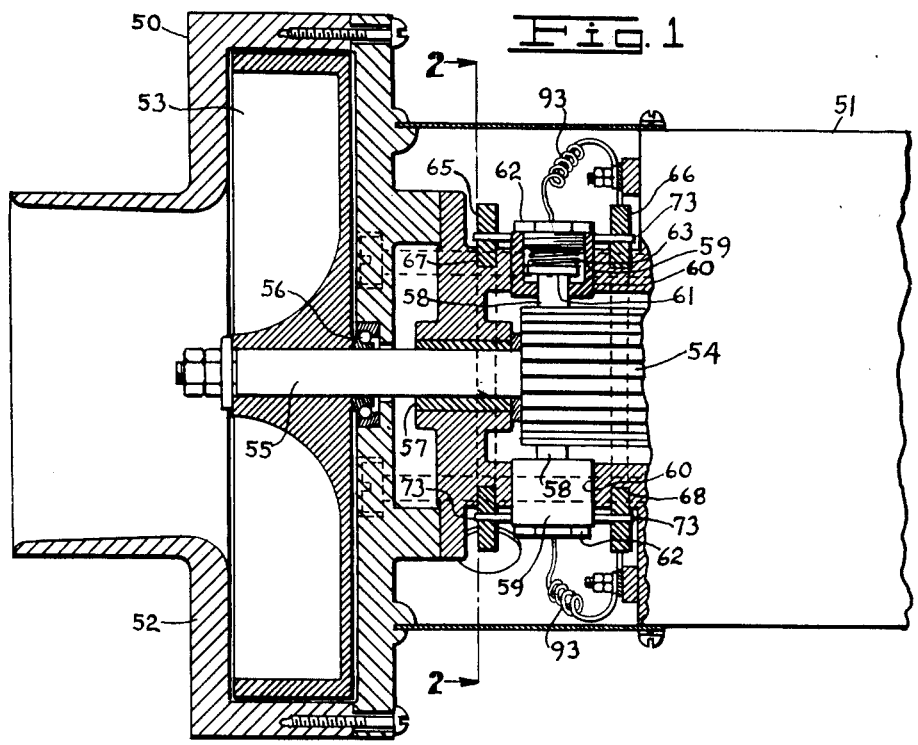
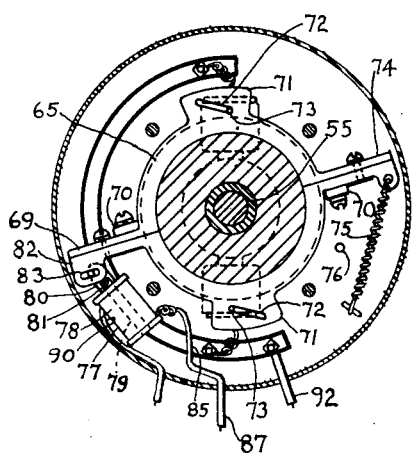
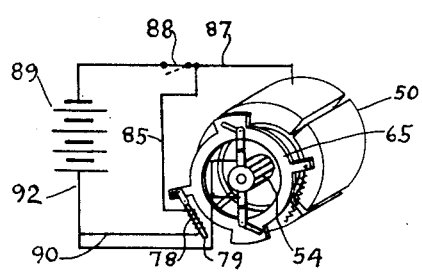
INVENTOR.
LESTER H. MILES
BY
ATTORNEY.

Patented May 15, 1934

1,958,633

UNITED STATES PATENT OFFICE 1,958,633

SIREN

Lester H. Miles, Los Angeles, Calif.

Original application November 14, 1927, Serial No. 233,094. Divided and this application October 20, 1930, Serial No. 489,808. Renewed July 31, 1933

4 Claims. (Cl. 171—324)

This invention relates to motor driven sirens.

The general object of this invention is to provide an improved electric motor driven siren wherein the motor brushes may be retracted from engagement with the armature.

Another object of this invention is to provide an improved motor wherein the brushes are normally out of engagement with the armature and wherein mechanically operated means is provided for causing the brushes to engage the armature when current is directed to the motor.

A further object of the invention is to provide a siren having a motor driving the rotor of a siren with the brushes arranged so that when the current is cut off from the motor the siren rotor and motor armature may rotate freely without the friction of the brushes on the armature.

Other objects of this invention will be apparent from the following description taken in connection with the accompanying drawing wherein:

Fig. 1 is a central, vertical, longitudinal section through a siren and a portion of a motor showing the rotor and the brush actuating means.

Fig. 2 is a section taken on line 2—2 of Fig. 1 showing the brush actuating means, and Fig. 3 is a diagrammatic view of the electrical hook up of the motor and brush actuating means.

This application is a division of my co-pending application Serial No. 233,094, filed November 14, 1927.

In Figs. 1 to 3 inclusive I have shown my invention as embodied in a motor driven siren indicated generally at 50. The motor which is shown as secured to and adapted to actuate the siren is indicated generally at 51. The siren includes a casing 52 having a rotor 53 mounted therein. The motor 51 may be of usual construction except for the brushes and includes an armature 54 and an armature shaft 55 on which the siren rotor 53 may be secured by any suitable means. The shaft 55 is preferably supported in a bearing 56 in the siren casing 52 in addition to being supported in a bearing 57 on the motor but if desired the bearing 56 may be omitted.

The motor brushes 58 are shown as mounted in housings 59 which are positioned in apertures 60 in the motor housing. Each of the brushes 58 includes an enlarged head 61 which is positioned within the housing 59 and prevents the brush from being displaced from the housing. Each of the housings 59 is provided with a threaded detachable cap 62 and within the housings I provide a coiled spring 63 which bears against the cap 62 and the head 61 of the brush and tends to urge the brush head against the bottom of the housing.

For actuating the brushes 58 I provide a pair of rings or actuating members 65 and 66 which are rotatable in grooves 67 and 68 in the motor casing. The rings 65 and 66 are of like construction and are each split as at 69 to facilitate assembly. The rings 65 and 66 are preferably connected by cross bars 70 and are each provided with ears 71 in each of which I provide an inclined slot 72. Pins or operating members 73 on and projecting from each side of the brush housings 59 are positioned in the slots 72 of each ring. The ring 65 is provided with an arm 74 to which a coiled spring 75 is attached which normally tends to hold the arm 74 against the stop 76 so that the rings will force the pins 73 of the brush housings to the end of the slots 72 farthest from the center of the armature thus raising the brushes out of contact with the armature.

For moving the ring 65 in the opposite direction to move the brush housing pins 73 in the slots 72 towards the armature I provide a solenoid 77 including windings 78 and a core 79. The core 79 is pivotally secured to a link 80 as at 81 and the link 80 is pivotally and slidably connected to an arm 82 of the ring 65 as at 83.

For energizing the solenoid windings as shown in Fig. 3 a wire 85 connects one end of the windings 78 to a feed wire 87 which includes a control switch 88 and is connected to one side of a battery 89. The other end of the solenoid windings is connected by a wire 90 to another feed wire 92 which is connected to the other side of the battery 89.

The feed wire 87 connects to the field of the motor 51 and the other feed wire 92 is connected to the brushes 58 by wires 93. Thus it will be seen that when the control switch 88 is closed the current will flow from the battery 89 through the feed wire 87, to the solenoid windings 78 and thence through the wire 90, to the wire 92 and back to the battery 89. As the solenoid windings 78 are energized the core 79 will be moved and cause the rings 65 and 66 to move against the action of the spring 75 to cause the brushes to move into contact with the armature 54. When the brushes contact with the armature the current from the battery will pass through the feed wire 92 and wires 93 to the brushes and thence to the armature 54 whereupon the motor 50 will operate to rotate the siren rotor 53.

When the control switch 88 is opened the solenoid windings 78 cease to be energized and the spring 75 then moves the rings 65 and 66 to cause the brushes 58 to move out of contact with the armature 54 whereupon the flow of current to the motor will be cut off.

In using my siren by moving the brushes out of contact with the armature, the friction of the brushes against the armature is removed and in addition the tendency to brake due to regeneration of current in the field is overcome so that the motor rotor and the siren rotor continue to rotate at an operating speed for a considerable time after the supply of current to the motor has been cut off. This effects a large saving in electric current which is an item of considerable importance when operating the siren from the battery of a motor vehicle. The motor rotor acts as a fly wheel to maintain the momentum of the siren rotor when the current to the motor is discontinued so that the siren rotor "coasts" at an operating speed for a long time after the current to the motor is cut off.

From the foregoing description it will be apparent that I have provided a novel motor driven siren which is compact, durable and efficient in use.

Having thus described my invention, what I claim is:

1. In an electric motor including an armature, a plurality of electrical conductive brushes, electrically operated power multiplying means to retain said brushes in engagement with said armature when electric current is directed to said motor and mechanical means rotatable about the axis of said armature to retract said brushes from said armature when the current is not directed to said motor.

2. In combination with a casing, a shaft in said casing, a motor for driving said shaft, said motor being secured to said casing, said motor including an armature, armature brushes for said motor, said brushes being movable towards and from said armature, a circumferentially shiftable disk associated with said armature, said disk being shiftable about the axis of said armature, a pin on each brush, a slot on said disk for each pin, said slots being inclined, means to normally urge said disk to a position to cause said brushes to be withdrawn from said armature and electro-magnetic means for moving said disk to move said brushes toward said armature against the action of said resilient means when current is directed to said motor, said electro-magnetic means including a solenoid.

3. In combination with a casing, a shaft in said casing, a motor for driving said shaft, said motor including an armature, armature brushes for said motor, housings removably secured to said motor, brush containers movable in said housings, said brushes being disposed in said brush containers, means for urging said brushes towards said armature, a pair of shiftable disks arranged about said armature, a pin on each of said brush containers, there being a slot on said disk for each pin, said slots being inclined, means to normally urge said disk to a position to cause said slots to move said pins to thereby cause said brushes to be withdrawn from said armature and electro-magnetic means for moving said disks to thereby move said brushes towards said armature.

4. In combination with a casing, a shaft in said casing, a motor for driving said shaft, means to secure said motor to said casing, said motor including an armature, armature, brushes for said motor, housings removably secured to said motor, brush containers movable in said housings, said brushes being disposed in said brush containers, resilient means in said brush containers for urging said brushes towards said armatures, a pair of disks circumferentially spaced about said armature, a pin on each of said brush containers, there being opposed slots on said disks for each pin, said slots being inclined, means to normally urge said disks to a position to cause said slots to move said pins to thereby cause said brushes to be withdrawn from said armature and electro-magnetic means for moving said disks to thereby move said brushes towards said armature against the action of said resilient means, said electro-magnetic means being operable when current is directed to said motor, said electro-magnetic means including a solenoid and means to connect said solenoid to one of said disks.

LESTER H. MILES.